US009227559B2

(12) United States Patent
Frankovich

(10) Patent No.: US 9,227,559 B2
(45) Date of Patent: Jan. 5, 2016

(54) VEHICLE LIGHTING CONTROL SYSTEM AND METHOD

(71) Applicant: Revolights, Inc., Emeryville, CA (US)

(72) Inventor: John Kent Frankovich, Emeryville, CA (US)

(73) Assignee: Revolights, Inc., Emeryville, CA (US)

( * ) Notice: Subject to any disclaimer, the term of this patent is extended or adjusted under 35 U.S.C. 154(b) by 92 days.

(21) Appl. No.: 14/135,301

(22) Filed: Dec. 19, 2013

(65) Prior Publication Data

US 2014/0184067 A1 Jul. 3, 2014

Related U.S. Application Data

(63) Continuation-in-part of application No. 13/972,563, filed on Aug. 21, 2013, now Pat. No. 8,851,719.

(60) Provisional application No. 61/748,011, filed on Dec. 31, 2012.

(51) Int. Cl.
*B60Q 1/32* (2006.01)
*B62J 6/00* (2006.01)
*B62J 6/20* (2006.01)

(52) U.S. Cl.
CPC . *B60Q 1/326* (2013.01); *B62J 6/00* (2013.01); *B62J 6/001* (2013.01); *B62J 6/20* (2013.01)

(58) Field of Classification Search
CPC .............. B62J 6/00; B62J 6/001; B62J 6/005; B62J 6/20; B60Q 1/326; B60Q 1/11; B60Q 1/14
USPC ........ 315/76, 77, 80; 362/192, 459, 464, 473, 362/500, 249.02, 543; 340/426.33, 432, 340/444, 459, 815.45
See application file for complete search history.

(56) References Cited

U.S. PATENT DOCUMENTS 2,788,763 A 4/1957 Ries
3,764,976 A 10/1973 MacMahon
3,897,409 A 7/1975 Huper et al.
3,972,302 A 8/1976 Sherman
3,982,771 A 9/1976 Tropeano (Continued)

FOREIGN PATENT DOCUMENTS

GB 2345529 A 7/2000
GB 2382211 A 5/2003

(Continued)

OTHER PUBLICATIONS

MonkeyLectric "Mini Monkey Light—8-Bit Bike Light" kickstarter.com.

*Primary Examiner* — Thai Pham
(74) *Attorney, Agent, or Firm* — Jeffrey Schox; Diana Lin

(57) ABSTRACT

A lighting control system for a wheel of a vehicle, the lighting control system including a brush configured to statically mount to a body of the vehicle; a hub for the wheel; and a plurality of arcuate contacts statically mounted to the hub, each of the plurality of contacts comprising an arc angle measure of less than 360 degrees, the plurality of contacts configured to rotate relative to the brush, each contact operable between: a connected mode wherein the contact is electrically connected to the brush during rotation relative to the brush and a disconnected mode wherein the contact is electrically disconnected from the brush during rotation relative to the brush.

20 Claims, 11 Drawing Sheets

(56) References Cited

U.S. PATENT DOCUMENTS

| | | | |
|---|---|---|---|
| 3,987,409 | A | 10/1976 | Freeman |
| 4,049,959 | A | 9/1977 | Ledterman |
| 4,088,882 | A | 5/1978 | Lewis |
| 4,135,229 | A | 1/1979 | Modurkay |
| 4,204,191 | A | 5/1980 | Daniels |
| 4,225,848 | A | 9/1980 | Roberts |
| 4,321,883 | A | 3/1982 | Ruppa |
| 4,483,586 | A | 11/1984 | Sisto |
| 4,575,189 | A | 3/1986 | Johnson |
| 4,586,454 | A | 5/1986 | Hedquist et al. |
| 4,763,230 | A | 8/1988 | Cummings et al. |
| 4,787,014 | A | 11/1988 | Wodder et al. |
| 4,860,177 | A | 8/1989 | Simms |
| 4,875,142 | A | 10/1989 | Spector |
| 5,121,305 | A | 6/1992 | Deed et al. |
| 5,283,547 | A | 2/1994 | Leon |
| 5,584,562 | A | 12/1996 | Geran |
| 5,652,677 | A | 7/1997 | Burison |
| 5,800,039 | A | 9/1998 | Lee |
| 5,874,792 | A | 2/1999 | Chen et al. |
| 5,903,224 | A | 5/1999 | Reynolds |
| 6,072,386 | A | 6/2000 | Yu |
| 6,126,243 | A | 10/2000 | Okajima et al. |
| 6,170,968 | B1 | 1/2001 | Caswell |
| 6,227,688 | B1 | 5/2001 | Taylor et al. |
| 6,241,371 | B1 | 6/2001 | Dai |
| 6,247,548 | B1 | 6/2001 | Hayashi et al. |
| 6,265,984 | B1 | 7/2001 | Molinaroli |
| 6,286,982 | B1 | 9/2001 | Tashiro |
| 6,359,551 | B1 | 3/2002 | Suda |
| 6,492,963 | B1 | 12/2002 | Hoch |
| 6,501,199 | B2 | 12/2002 | Hung |
| 6,565,242 | B2 | 5/2003 | Dai |
| 6,598,894 | B1 | 7/2003 | Fujii et al. |
| 6,789,928 | B2 | 9/2004 | Khan |
| 6,805,473 | B2 | 10/2004 | Beard |
| 6,822,357 | B2 | 11/2004 | Hung |
| 6,824,284 | B2 | 11/2004 | Chinniah et al. |
| 6,988,818 | B2 | 1/2006 | Tristram |
| 7,021,800 | B2 | 4/2006 | Roberts |
| 7,046,131 | B2 | 5/2006 | Todorox |
| 7,048,421 | B1 * | 5/2006 | Allen-Atkins ................ 362/500 |
| 7,063,391 | B2 | 6/2006 | Peng |
| 7,096,046 | B2 | 8/2006 | Shapiro et al. |
| 7,417,555 | B2 | 8/2008 | Chivarov et al. |
| 7,438,454 | B2 | 10/2008 | Chinniah et al. |
| 7,477,208 | B2 | 1/2009 | Matlock et al. |
| 7,488,100 | B2 | 2/2009 | Roberts |
| 8,337,060 | B1 | 12/2012 | Frankovich |
| 2002/0163817 | A1 | 11/2002 | Bukowsky |
| 2002/0181242 | A1 | 12/2002 | Dai |
| 2003/0112632 | A1 | 6/2003 | Forsythe et al. |
| 2003/0169594 | A1 * | 9/2003 | Khan ............................ 362/500 |
| 2004/0114383 | A1 | 6/2004 | Beard |
| 2005/0047155 | A1 | 3/2005 | Samuel |
| 2006/0092647 | A1 | 5/2006 | Glasser |
| 2006/0158890 | A1 | 7/2006 | Freedman |
| 2007/0014119 | A1 | 1/2007 | Burkett |
| 2007/0035956 | A1 | 2/2007 | Topps |
| 2007/0063831 | A1 | 3/2007 | Perkins et al. |
| 2007/0171664 | A1 | 7/2007 | Shih et al. |
| 2007/0285934 | A1 | 12/2007 | Carillo |
| 2008/0023934 | A1 | 1/2008 | Van Houweling |
| 2008/0136660 | A1 | 6/2008 | Bailey |
| 2008/0219014 | A1 | 9/2008 | Loibl |
| 2009/0082914 | A1 | 3/2009 | Yuan |
| 2010/0225198 | A1 | 9/2010 | Lau et al. |

FOREIGN PATENT DOCUMENTS

| | | | |
|---|---|---|---|
| GB | 2409440 | A | 6/2005 |
| WO | 0133700 | A1 | 5/2001 |
| WO | 2008071198 | A | 6/2008 |

* cited by examiner

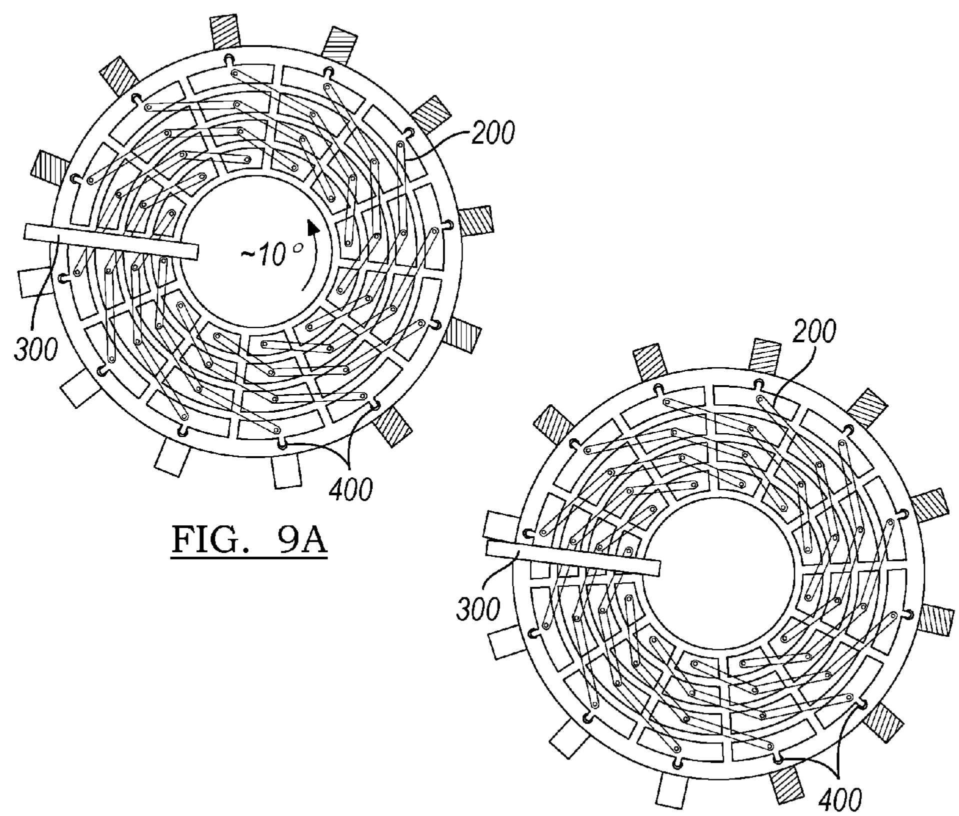
FIG. 9A
FIG. 9B
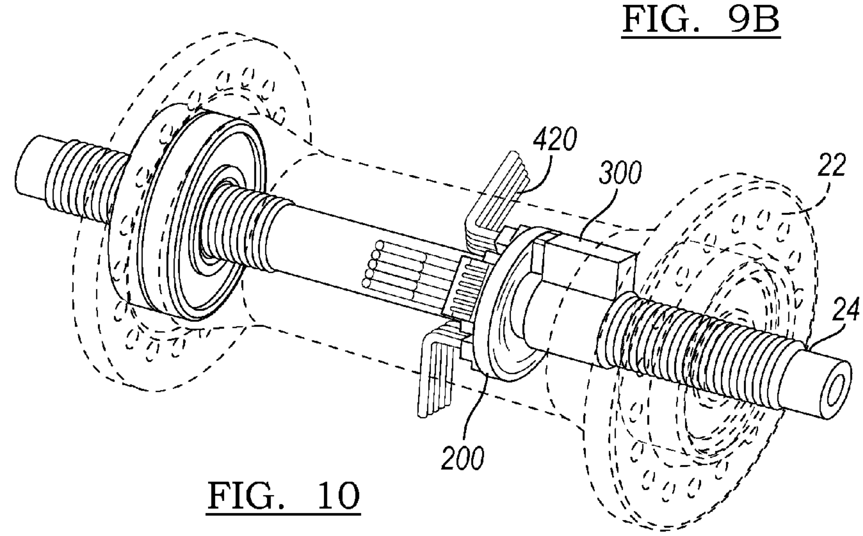
FIG. 10

VEHICLE LIGHTING CONTROL SYSTEM AND METHOD

CROSS-REFERENCE TO RELATED APPLICATIONS

This application claims the benefit of U.S. Provisional Application No. 61/748,011 filed 31 Dec. 2012, which is incorporated in its entirety by this reference. This application is a continuation in part of U.S. application Ser. No. 13/972,563 filed 21 Aug. 2013, which is incorporated in its entirety by this reference.

TECHNICAL FIELD

This invention relates generally to the lighting systems field, and more specifically to a new and useful lighting control system in the lighting system field.

BRIEF DESCRIPTION OF THE FIGURES

FIGS. 9A and 9B are schematic representations of the contacts of the second lighting control system in a first angular position and a second angular position, respectively, wherein the second angular position is rotated 10 degrees in the clockwise direction relative to the first angular position.

FIG. 10 is a perspective view of a third variation of the lighting control system mounted to a wheel.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
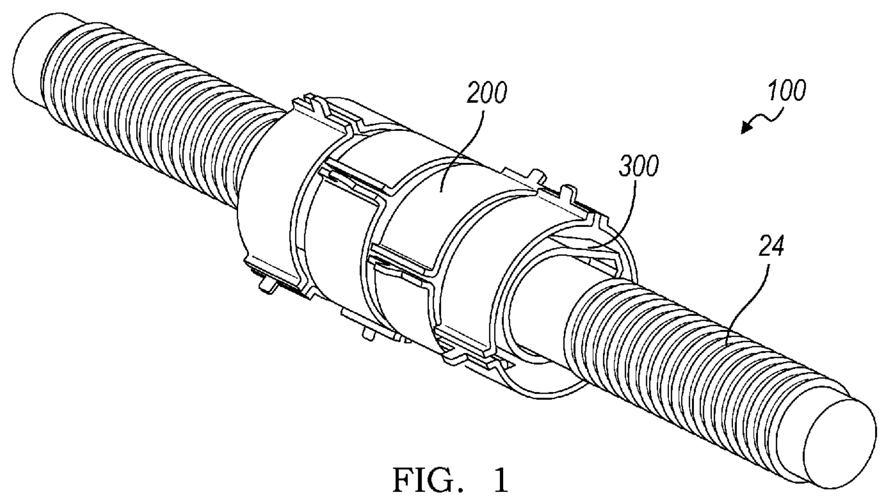
FIG. 1 is a perspective view of a variation of the lighting control system mounted to an axle.
Figure 2:
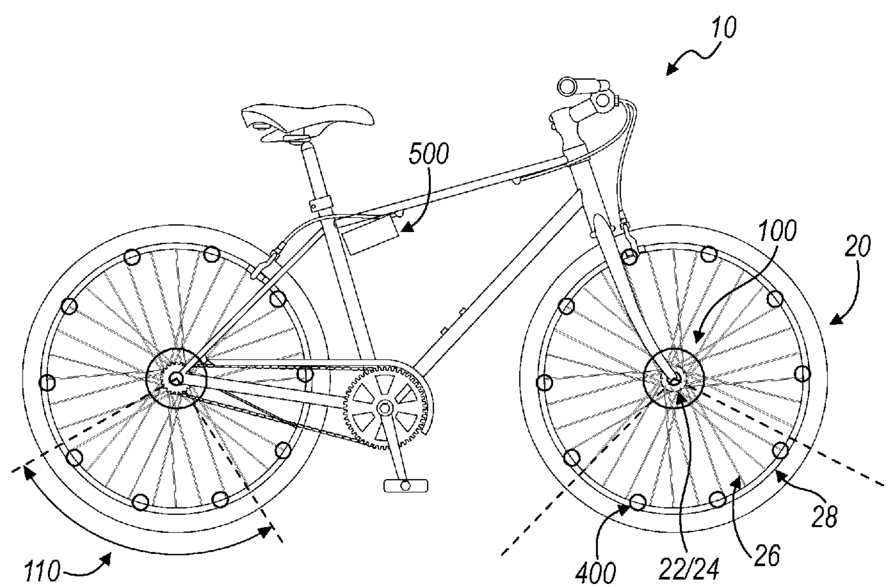
FIG. 2 is a schematic representation of an example of a vehicle including the lighting control system.

As shown in FIG. 1, the lighting control system 100 for a wheel 20 includes an electrically conductive brush 300 and a set of contacts 200 configured to rotate with a rotating vehicle component during vehicle operation. The lighting control system 100 functions to control a plurality of lights to operate between a lit mode and a dim mode. As shown in FIG. 2, the plurality of light emitting elements 400 are configured to couple to the wheel 20, more preferably the circumference of the wheel 20 (e.g., to the rim), and the lighting control system 100 is configured to control the plurality of lights to operate between the lit mode, wherein the light emitting element 400 projects light radially outward of the wheel 20 when the light emitting element 400 is within an arcuate area 110 having an arc angle of less than 360 degrees, and a dim mode when the light emitting element 400 is outside of the arcuate area 110. The arcuate area 110 is preferably defined from a static point on the vehicle coupled to the wheel 20, but can alternatively be defined from any other reference point.

The lighting control system 100 is preferably a passive control system, and leverages wheel rotation during vehicle operation to control which lights are placed in the lit and dim modes. However, the lighting control system 100 can alternatively be passive. The lighting control system 100 is configured to mount to the wheel 20 of a vehicle. More preferably, the lighting control system 100 is configured to mount to or integrate into the hub 22 and axle 24 of the wheel. However, the lighting control system 100 can alternatively mount to any other suitable component of a vehicle having a first element rotating about a second element during vehicle operation.

Figure 7A:
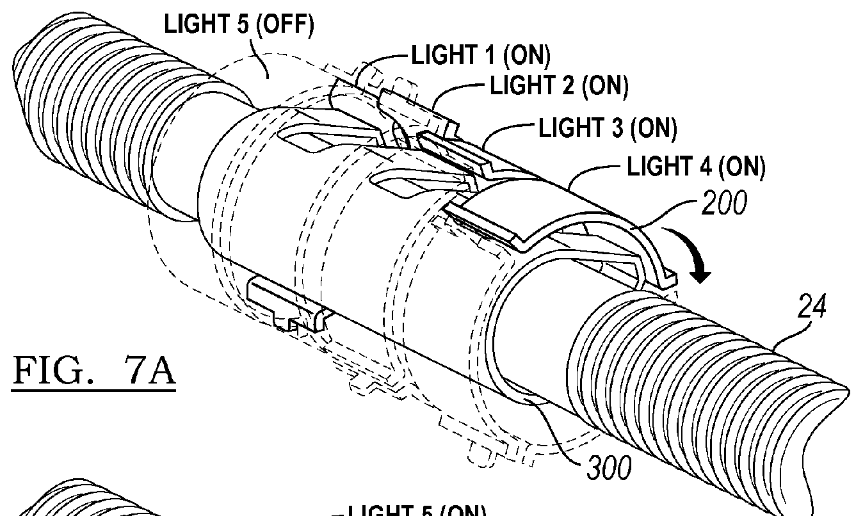
FIGS. 7A, 7B, and 7C are perspective views of the first variation of the lighting control system in a first, second, and third position, respectively, wherein the second position is rotated in a clockwise direction relative to the first position, and the third position is rotated in a clockwise direction relative to the second position.
Figure 7B:
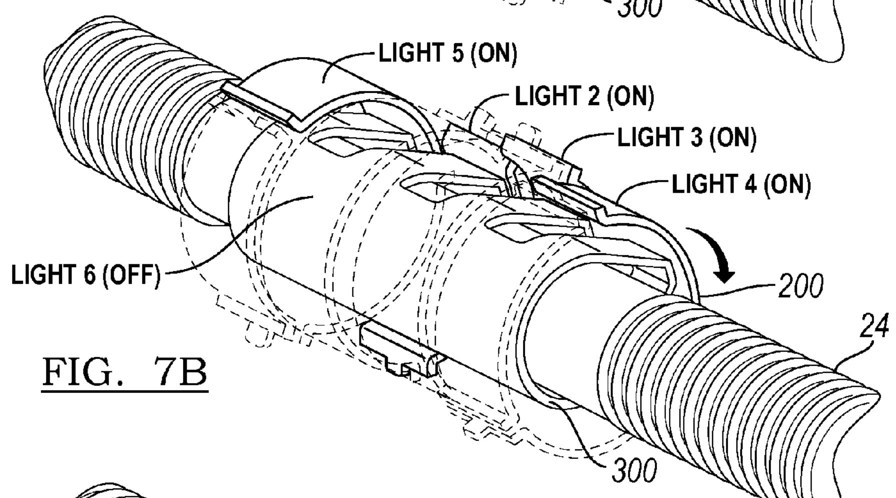
Figure 7C:
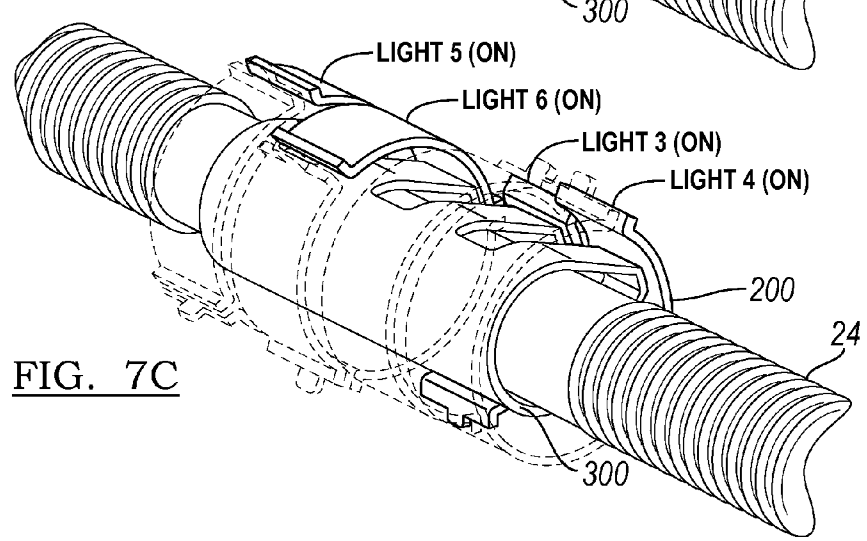

During vehicle operation, the plurality of contacts 200 rotate relative to the brush 300, for example as shown in FIGS. 7 and 9. The plurality of contacts 200 preferably rotate together, but each contact can alternatively rotate independently. As each contact passes by the brush 300 over the course of the contact rotation relative to the brush 300, the contact powers the respective light emitting element 400 connected to the contact (e.g., by electrical connection with the brush 300, induced current, etc.). The length of each contact preferably corresponds with the arc length of the arcuate area 110 in which the light emitting element 400 is to be in the lit mode. More preferably, the arc angle of each contact is equal to the arc angle of the arcuate area 110.

The lighting control system 100 confers several benefits over conventional wheel lighting systems, which are enabled by the inventor's discovery of an ideal lighting area for a wheel 20. First, by using a passive control mechanism (e.g., the contact length) that defines the length of the arcuate area 110 in which the light emitting element 400 is in the lit mode, this system can light the desired portions of the wheel 20 at any wheel velocity, without having to recalculate and refresh the frequency at which the light emitting elements 400 should be lit and dimmed, as seen in actively controlled systems. Second, this system reduces overall system cost by removing some, more preferably all, electronic control components, such as circuit boards and sensors, by using the passive control mechanism. Third, this system reduces the complexity of conventional wheel lighting systems, enabling more reliable and simpler installation into vehicle wheels. Fourth, this system is more robust than conventional wheel lighting systems due to the reduction in complex electronic control components that can fail during wheel operation. Fifth, this design promotes component fixture to the vehicle frame, which enables the power source 500 powering the light emitting elements 400 to be decoupled from the wheel 20 instead of requiring the power source 500 to rotate with the wheel 20, as seen in conventional systems.

The lighting control system 100 is preferably configured for incorporation into a wheel 20, but can alternatively be configured for incorporation into a vehicle. The wheel 20 preferably includes an axle 24, a hub 22 substantially concentrically disposed about the axle 24 (e.g., within a threshold tolerance), and one or more bearings arranged between the hub 22 and the axle 24 that facilitates hub rotation about the axle 24. The hub 22 preferably includes a cylindrical hub body terminating in hub flanges extending radially outward from the hub body. The hub 22 is preferably hollow, and defines an inner arcuate surface (e.g., a concave surface) and an outer radial surface (e.g., a convex surface). The axle 24 preferably has a central longitudinal axis, and is preferably cylindrical, but can alternatively be prismatic, have a teardrop shaped cross section, or have any other suitable configuration. The axle 24 is preferably substantially solid, but can alternatively be hollow and include an outer arcuate surface and an inner arcuate surface defining a lumen extending along the length of the axle 24. The lumen can extend through the entirety of the axle 24, or can extend along a portion of the axle 24 (e.g., from one axle end to a bearing mounting point distal the axle end, extend between a first and second bearing mounting point, etc.). The lumen can extend along the longitudinal axis of the axle 24, or can be offset from the longitudinal axis. The lumen can extend parallel to the longitudinal axis, can extend at an angle to the longitudinal axis, rotate about the longitudinal axis, or be configured in any other suitable manner.

The wheel 20 can additionally include a rim concentrically arranged about the axle 24 and spokes 26 radially connecting the rim 28 to the hub 22, more preferably the hub flanges. The wheel 20 can additionally include a tire disposed about the rim 28. The vehicle can be an automobile, motorcycle, bicycle, skateboard, scooter, or any other suitable vehicle including a wheel 20. The vehicle preferably includes at least a first and a second wheel 20 (e.g., a front and rear wheel, respectively), wherein the wheels are preferably arranged such that the primary plane of the first and second wheels are preferably coplanar, but can alternatively be parallel within the vehicle. The rear wheel can additionally include a cassette (e.g., a set of one or more gears). The wheels preferably couple to the frame of the vehicle. More preferably, the wheel axle 24 ends couple to retention mechanisms on the frame of the vehicle (e.g., a stop or quick release assembly), but any other suitable portion of the wheel 20 can alternatively couple to the vehicle frame.

Figure 3:
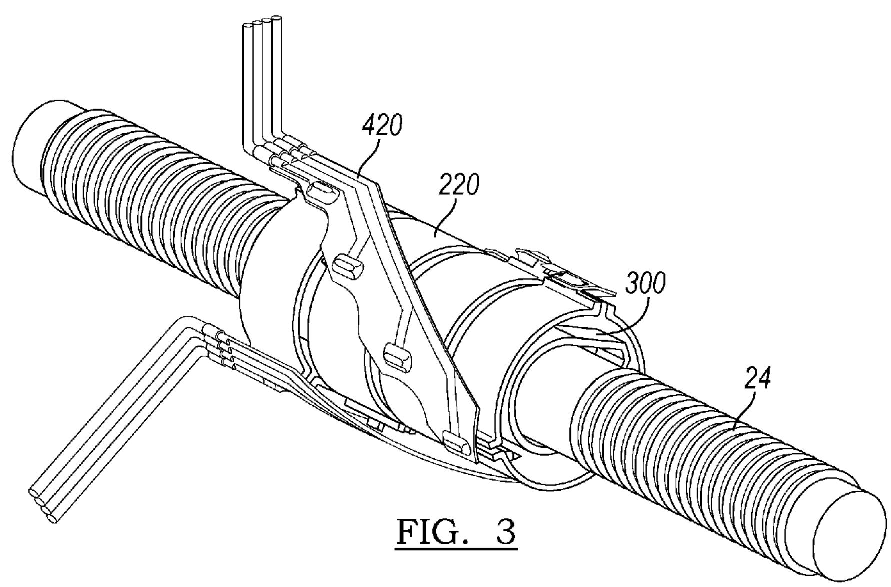
FIG. 3 is a perspective view of a first variation of the lighting control system including electrical connections.
Figure 4:
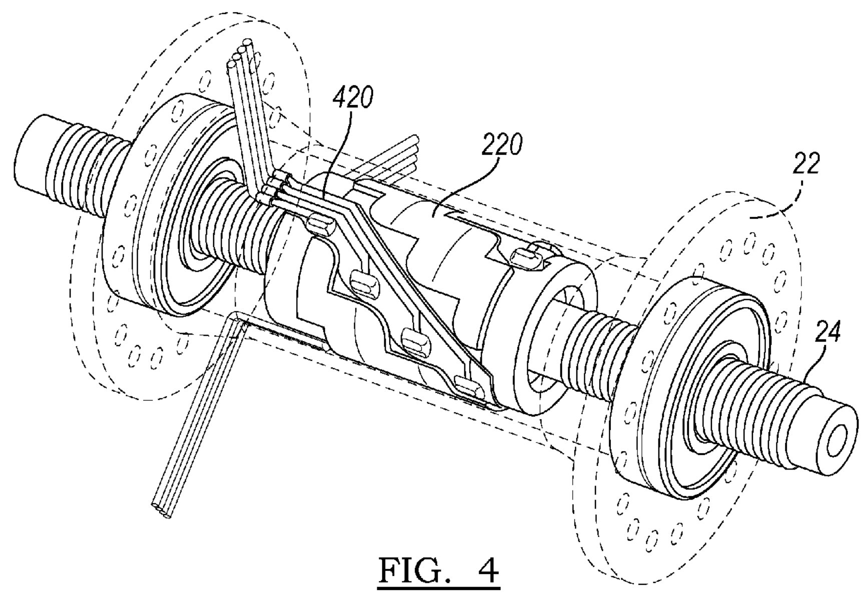
FIG. 4 is a perspective view of the first variation of the lighting control system including a support.

As shown in FIG. 1, the set of contacts 200 of the lighting control system 100 functions to control the operation mode of the light emitting elements 400. More preferably, each contact controls the position and length of the arcuate area 110 in which the light emitting element 400 is to be in the lit mode. The plurality of contacts 200 preferably cooperatively define a controller (passive controller). The lighting control system 100 preferably includes multiple contacts, but can alternatively include a single contact. Each contact is preferably electrically conductive, and is preferably made of a metal such as copper, gold, or any other suitable conductive material. Each contact is preferably electrically isolated from the remainder of contacts. Each contact is preferably electrically connected to a terminal of a light emitting element by an electrical connection 420 (e.g., as shown in FIG. 3), wherein the brush 300 is electrically connected to a terminal of a power source 500. Alternatively, each contact can be electrically connected to a terminal of a power source 500, wherein the brush 300 is electrically connected to a terminal of a light emitting element. Each contact can be connected to one or more light emitting elements 400. In one variation of the system, each contact is connected to a first and a second light emitting element, wherein the first light emitting element preferably opposes the second light emitting element across the wheel width (e.g., thickness). In another variation of the system, each contact is connected to a single light emitting element. Each wheel 20 preferably includes a first and second lighting control system, each including a set of contacts, wherein the first and second lighting control systems preferably control a first and second set of light emitting elements 400, respectively. The first and second contact sets are preferably disposed on opposing sides of the wheel 20, but can alternatively be otherwise arranged. Alternatively, a wheel 20 can include a single lighting control system 100 that controls one or more sets of light emitting elements 400.

The plurality of contacts 200 are preferably configured to mount to a rotating component of the vehicle, but can alternatively mount to a component of the vehicle frame. More preferably, the plurality of contacts are configured to mount to the hub 22 of the wheel, but can alternatively mount to the spokes of the wheel, the axle 24 of the wheel, a bearing of the wheel, the fork of the vehicle frame, or any other suitable wheel or vehicle component. The plurality of contacts preferably mount to an arcuate surface of the hub 22, such as the inner arcuate surface or the outer arcuate surface of the hub. Alternatively, the plurality of contacts can mount to an end of the hub, such as the hub flange or other portion of the hub end.

The plurality of contacts 200 are preferably configured to rotate about an axis of rotation. The plurality of contacts 200 preferably rotate together, but can alternatively rotate independently. The plurality of contacts 200 are preferably configured to rotate with the wheel 20 relative to the frame, more preferably configured to mount to and rotate with the hub 22 of the wheel. However, the plurality of contacts 200 can be configured to statically mount to a static frame component, wherein the brush 300 rotates relative to the plurality of contacts. The plurality of contacts 200 are preferably further configured to rotate relative to the brush 300. In one variation of the system, the plurality of contacts 200 are preferably arranged such that the axis of rotation of the plurality of contacts 200 (axis of controller rotation) is parallel to the brush longitudinal axis. The plurality of contacts 200 can be rotatably disposed about the brush 300 (e.g., encircle the brush, be concentrically arranged about the brush longitudinal axis, etc.). Alternatively, the brush 300 can rotate about the plurality of contacts 200 (e.g., wherein the contacts are disposed on an outer arcuate surface of a rotating drum, etc.). The plurality of contacts 200 can alternatively be arranged such that the axis of rotation is perpendicular to the brush longitudinal axis, or arranged at any other suitable angle to the brush longitudinal axis.

Each of the plurality of contacts 200 preferably functions as a switch, and is operable between a connected mode, wherein the contact is mechanically and electrically connected to the brush 300, and a disconnected mode, wherein the contact is mechanically and electrically disconnected from the brush 300. Each contact preferably controls a light emitting element 400 to operate in the lit mode while a portion of the contact is electrically connected to the brush 300 (e.g., in the connected mode), and controls the light emitting element 400 to operate in the dim mode when the contact is no longer electrically connected to the brush 300 (e.g., in the disconnected mode).

Each contact is preferably configured to mechanically and electrically connect to the brush 300 during a portion of the contact rotation path as the contact rotates relative to the brush 300, such that the brush 300 slides along the contact body. The portion or segment of the contact rotation path in which the contact connects with the brush 300 is preferably defined by the arc angle of the contact body. The arc angle of each contact is preferably equivalent to the arc angle of the arcuate area 110, wherein the body of each contact preferably traces a segment of the rotation path. The arc angle of each contact (and thus, the arcuate area 110) is preferably less than 360 degrees, more preferably less than 240 degrees, but can alternatively be any other suitable arc angle (e.g., 100 degrees, 90 degrees, between 120 and 60 degrees, etc.). In one variation of the system, each contact has an arc angle of 120 degrees. Each contact is preferably arcuate, but can alternatively be linear or have any other suitable shape. The contact is preferably concave, but can alternatively be convex. In one variation, the contact is a stamped strip that is bent along a longitudinal axis. In another variation, the contact is a printed or adhered flat strip that is bent within a plane. In another variation, a contact can be formed from a plurality of sub-contacts that are electrically connected to form a singular contact. Each contact preferably has substantially the same arc angle, but can alternatively have different arc angles. The length of each contact is preferably defined by the arc angle and the distance of the contact from the axis of rotation. Each contact is preferably angularly offset from an adjacent contact about the axis of rotation, but can alternatively be substantially aligned with an adjacent contact. The angular offset is preferably the arc angle of the contacts divided by the number of rings (e.g., such that there will always be one contact from the first or last rings in the ring series contacting the brush 300. Adjacent contacts can be angularly offset by 30 degrees, 15 degrees, 45 degrees, or offset by any other suitable angle.

Figure 8:
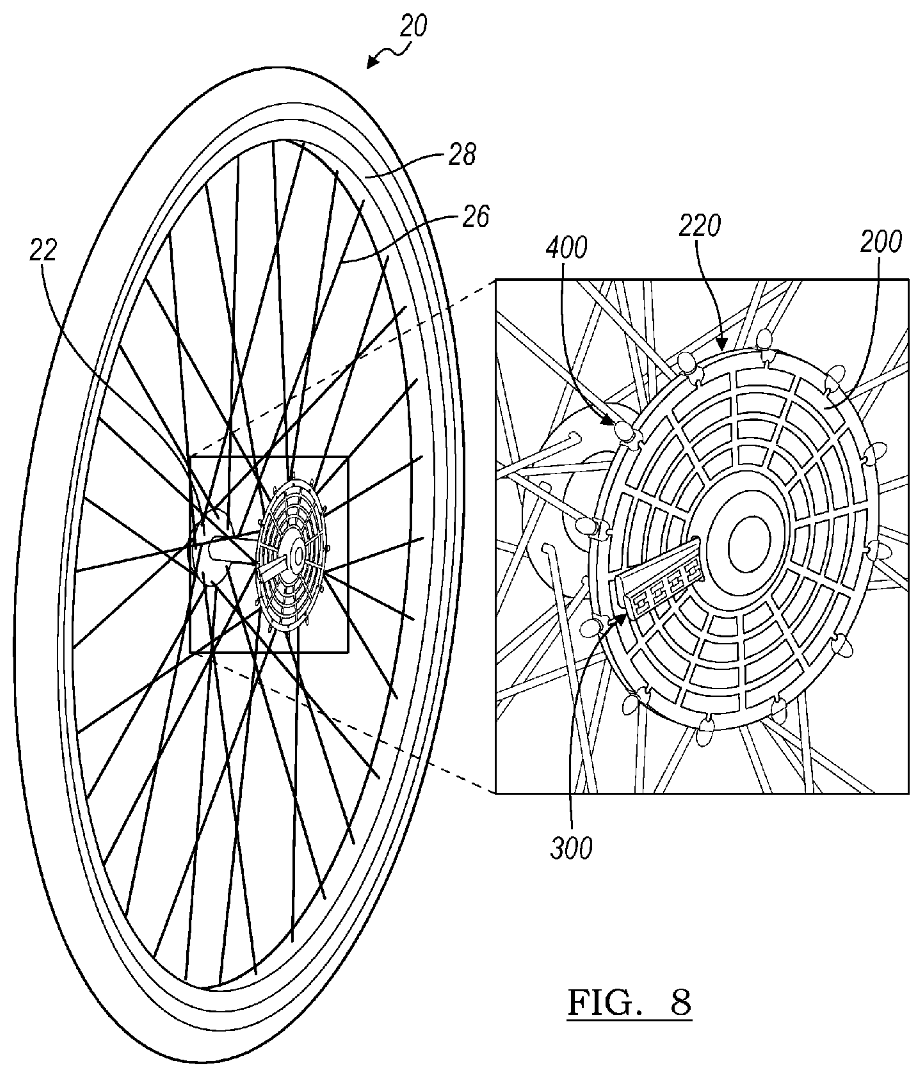
FIG. 8 is a perspective view of a second variation of the lighting control system mounted to a wheel.
Figure 11:
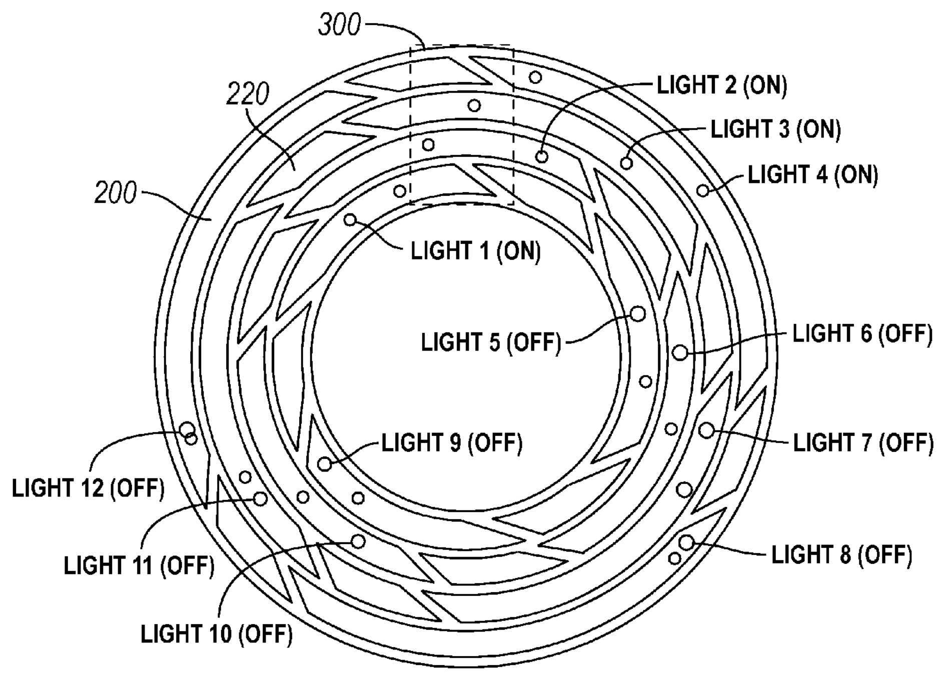
FIG. 11 is an end-on view of the contacts of the third variation.

As shown in FIG. 1, FIG. 8, and FIGURE ii, the plurality of contacts 200 is preferably arranged into a series of rings, but can alternatively be otherwise arranged. Each ring preferably includes multiple contacts, but can alternatively include a single contact. Each ring is preferably cooperatively formed by the same number of contacts, but can alternatively be cooperatively formed by different numbers of contacts. The number of contacts in each ring is preferably approximately the number of contacts that can be fit into 360 degrees, based on the arc angle of the contact, but can alternatively be less, wherein each ring) includes a gap 202 between the constituent contacts (e.g., as shown in FIG. 11. The contacts are preferably substantially evenly distributed about the ring (e.g., within a threshold tolerance), but can alternatively be unevenly distributed. The contacts of each ring are preferably offset from the contacts of an adjacent ring by the offset angle. In one variation of the system, the rings have substantially the same radius (e.g., within a tolerance threshold) and are coaxially aligned along the axis of rotation. In this variation, the multiple rings preferably cooperatively form a cylinder. In another variation of the system, the rings are arranged concentrically and have different radii. In this variation, the multiple rings preferably share a plane. However, the contacts can be otherwise arranged. The number of rings preferably corresponds to the number of lights that are simultaneously in the lit mode (e.g., wherein the brush 300 is configured to contact a portion of each ring at any point during wheel rotation or controller rotation relative to the brush 300). For example, when four lights are to be simultaneously lit for 120 degrees at any point during wheel rotation, the lighting control system 100 can include four rings, wherein each ring is formed from three arcuate contacts, each arcuate contact having an arc angle of 120 degrees, wherein each ring is angularly offset from the adjacent ring (e.g., rotated about the axis of rotation) by 30 degrees.

Figure 6:
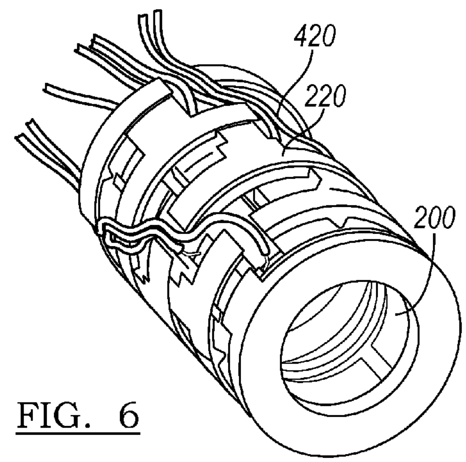
FIG. 6 is a perspective view of an end of the contacts within the support of the first variation.

The plurality of contacts 200 preferably include a support 220 that mounts the contacts to the wheel 20 or vehicle. In one variation of the system, the support 220 is an insert or plate that couples to the hub 22 or mounting component, as shown in FIGS. 8 and 11. In another variation of the system, the support 220 is configured to insert into and mount to the interior of a hub, as shown in FIG. 6. In another variation of the system, the support 220 forms the mounting component (e.g., forms the hub). The plurality of contacts 200 are preferably substantially permanently mounted to the support 220, but can alternatively be transiently or removably mounted to the support 220. The plurality of contacts 200 can be clipped to the support 220, adhered to the support 220, retained by a groove in the support 220, screwed into the support 220, or otherwise mechanically coupled to the support 220. The support 220 is preferably electrically insulative, and functions to insulate adjacent contacts from each other. The support 220 can be made of polymer (e.g., plastic or rubber), ceramic, or any other suitable material. The support 220 is preferably injection molded, but can alternatively be sintered, stamped, or otherwise manufactured. The support 220 is preferably formed as a singular piece, but can alternatively be formed as modules that can be coupled together to achieve a controller of any suitable length. In one variation of the system, the support 220 forms the hub 22 of the wheel. The support 220 includes recesses along an arcuate surface, preferably the inner arcuate surface but alternatively the outer arcuate surface, that function as mounting points for the contacts, wherein each contact preferably slides into and is retained by a recess. The support 220 can additionally include through holes (connector holes) aligned with each recess, through which an electrical connector can mechanically and electrically couple to the contact retained therein. A pin of the contact preferably extends through the connector hole to the opposing face of the support 220 to couple to the electrical connector, but the electrical connector can alternatively extend through the connector hole to connect to the contact. The support 220 can additionally include modular coupling mechanisms (e.g., clips, etc.), wire routing paths, or any other suitable feature.

In one example of the system, as shown in FIGS. 8 and 11, the contacts are arranged in concentric rings on a plate configured to mount perpendicular to an axis of rotation (e.g., wherein the contacts share a common plane). More preferably, the plate can be configured to mount to the end of a hub 22, perpendicular to the axis of hub rotation. The plate can be mounted to the hub flange, form the hub flange, extend from the hub outer arcuate surface, extend from the hub inner arcuate surface, or extend from any other suitable portion of the hub 22. The plate radius can be larger than or substantially the same as the hub external radius. Alternatively, the plate can be configured to mount along the body of the hub, between the hub 22 and the axle 24. In this variation, the plate is preferably a disc, wherein the outer plate radius is preferably less than the inner radius of the hub, and the inner plate radius is preferably more than the outer radius of the axle 24. However, the plate can have any other suitable configuration.

Figure 17:
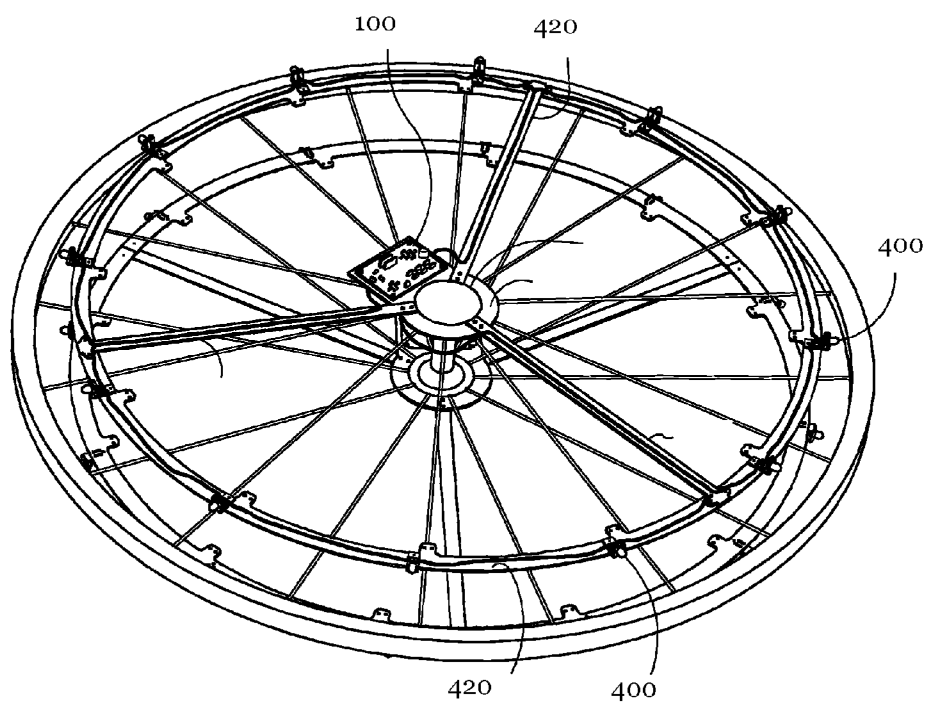
FIG. 17 is a perspective view of a bicycle wheel including a hub mounted lighting control system.

In another example of the system as shown in FIGS. 1 and 17, the contacts are arranged in a series of adjacently arranged coaxial rings, wherein the major plane of each ring is substantially perpendicular to the planes of the adjacent rings (e.g., within a threshold tolerance). The rings preferably have the same radii, but can alternatively have different radii. The contacts are preferably rotatably disposed about the rotational axis of the hub 22, but can alternatively be arranged separate from the hub 22. The contacts are preferably arranged along the inner arcuate surface of the hub, wherein the ring radii are preferably substantially similar to the inner hub radius, but can alternatively be arranged along the outer arcuate surface of the hub, wherein the ring radii are preferably substantially similar to the outer hub radius. The support 220 preferably forms the hub, but can alternatively be an insert that couples to the hub.

The brush 300 of the lighting control system 100 functions to cooperatively form a closed electrical circuit with the contacts to light the light emitting elements 400. The brush 300 can additionally function as the reference point from which the arcuate area 110 is defined. The brush 300 preferably defines the beginning of the arcuate area 110 (e.g., along the direction of wheel rotation), but can alternatively define the middle of the arcuate area 110 or the end of the arcuate area 110.

The brush 300 is preferably configured to couple to a static component relative to the vehicle frame, but can alternatively be configured to couple to a component that rotates relative to the vehicle frame, such as the hub 22. More preferably, the brush 300 is preferably configured to couple to the axle 24 of the wheel, but can alternatively be configured to couple to the fork supporting the axle 24 or to any other suitable vehicle frame component.

The brush 300 is preferably configured to electrically connect to a terminal of a power supply that powers the light emitting elements 400, but can alternatively be electrically connected to the light emitting elements 400, wherein the contacts are electrically connected to the power source 500. Alternatively, the brush 300 can be a magnet (e.g., a permanent magnet or electric magnet) or any other suitable magnetic field generator, wherein contact rotation through the induced magnetic field can generate a current that powers the connected light emitting element. The brush 300 can be connected to the power supply by a wire extending through the interior of the axle 24, by a wire extending along the axle 24 to the brush 300, by the axle itself 24 (e.g., wherein the axle is conductive), or by any other suitable electrical connection. The brush 300 is preferably electrically insulated from the axle, but can alternatively be electrically connected to the axle. The brush 300 is preferably electrically insulated from the vehicle frame, but can alternatively be electrically connected to the vehicle frame.

The lighting control system 100 preferably includes a single brush, but can alternatively include multiple brushes. Each brush 300 preferably includes multiple brush contacts, but can alternatively include a single brush contact. The brush contacts are preferably connected in parallel, but can alternatively be connected in series. Alternatively, each brush contact can be electrically isolated from the remaining brush contacts, and be independently connected to a power source terminal or light emitting element. The system preferably includes one brush or brush contact for each contact ring, but can alternatively include any suitable number of brushes or brush contacts. The brush 300 can be spring loaded to apply a connective force against the contacts (e.g., by design or through incorporation of a spring) and accommodate for surface variations along the contact or ring arcuate or planar surface, but can alternatively be substantially stiff and have a low spring coefficient.

As shown in FIG. 1, the brush 300 preferably extends radially relative to the contact rotation axis, but can alternatively and/or additionally extend along the contact rotation axis. The brush 300 preferably extends from an arcuate surface of the axle, preferably the outer arcuate surface but alternatively the inner arcuate surface, but can alternatively extend from the end of the axle (e.g., an end perpendicular to the longitudinal axis of the axle). The brush 300 is preferably arranged external the hub end (e.g., when the axle is assembled with the hub), but can alternatively be arranged along a portion of the axle 24 encapsulated by the hub 22 when the axle 24 is assembled with the hub 22 (e.g., between the hub ends). In a first variation, the brush 300 extends radially from the end of the axle 24 (e.g., radially from the axle longitudinal axis), beyond the hub inner diameter, more preferably beyond the hub outer diameter. This variation can be used with the variation of contacts arranged in a plate that is coupled to the hub end, wherein the brush contacts, if included, are arranged at different radial positions along the brush 300. In a second variation, the brush 300 extends radially from the axle body, wherein the brush length is less than the difference between the hub inner radius and the axle radius. This variation can be used with the variation of contacts arranged in a plate that is disposed between the axle 24 and the hub 22, wherein the brush contacts, if included, are arranged at different radial positions along the brush 300. In a third variation, the brush 300 extends along a substantial length of the axle 24, preferably along the axle length encapsulated by the hub 22 or plurality of contacts 200 when assembled, but alternatively any suitable axle length. This variation can be used with the variation of contacts arranged along the hub inner arcuate surface, wherein the brush contacts, if included, are arranged in parallel with the longitudinal axis of the axle 24 (e.g., have substantially the same radial position). However, the brush 300 can have any other suitable configuration.

Figure 5:
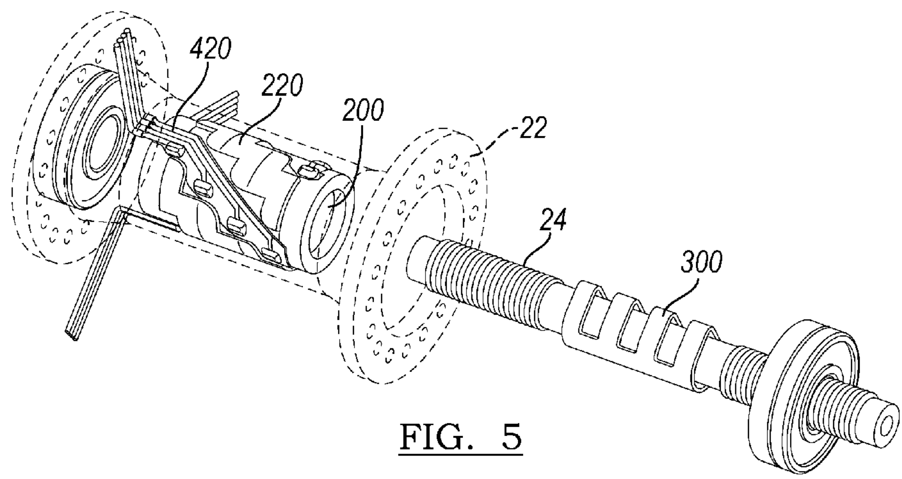
FIG. 5 is an exploded view of the first variation of the lighting control system, including contacts assembled to a support configured to couple to the wheel hub and a brush assembled to an axle.

In one example of a brush system as shown in FIGS. 1 and 5, the brush system includes a body defining a lumen configured to accept an axle 24 therethrough, and a protrusion radially extending from the body. The body preferably traces the axle circumference or body, and extends along a portion of the axle length. The body is preferably statically mounted to the axle 24 by a coupling mechanism, such as clips, screws, adhesive, or any other suitable coupling mechanism. The coupling mechanism can transiently or removably couple the body to the axle 24, or can substantially permanently couple the body to the axle. The body can additionally include an electric insulator that electrically insulates the axle 24 from the body, such as a rubber standoff. Alternatively, the body can include an electric contact that electrically couples the body to the axle 24. The protrusion preferably functions as the brush 300, and can be formed from a series of protrusions that each form a brush contact, or be formed from a single protrusion that forms the brush 300. The protrusion is preferably triangular such that the brush system cross section is substantially tear-shaped, but can alternatively be linear or have any other suitable form factor. The protrusion can radially extend from an end of the body, or can radially extend from an arcuate surface of the body. In another example, the brush 300 is formed as an integral component of the axle 24.

The brush system can additionally include alignment features that function to align the brush 300 in the appropriate position relative to the vehicle frame. The brush 300 is preferably configured to couple to the vehicle frame more than 90 degrees from the fork supporting the wheel 20, more preferably half the contact arc angle more than 90 degrees from the fork. However, the brush 300 can be arranged at any suitable angle from the fork, depending on the contact arc angle and the desired angle of the center of the lighted arcuate area 110.

For example, if the desired angle of the arcuate area center is 135 degrees from the fork and the arcuate area has an arc angle of 120 degrees, the brush 300 is preferably arranged 195 degrees from the fork, opposing wheel rotation during forward movement of the vehicle (e.g., when the vehicle moves in the direction of the vehicle steering mechanism). In one variation, the brush 300 system includes an alignment mechanism that couples to and/or aligns with a portion of the fork (e.g., the end of the fork, the dropout, the concave portion retaining the axle 24, etc.) to orient the brush 300 in the desired configuration. In another variation, the axle 24 is asymmetric and the brush 300 aligns relative to the axle asymmetry. However, the brush system can include any other suitable alignment feature.

As shown in FIGS. 2, and 9, the lighting control system 100 can additionally include a set of light emitting elements 400, wherein the set of light emitting elements 400 function to emit light in a pattern determined by the contact pattern. The lighting control system 100 preferably includes a plurality of light emitting elements 400, but can alternatively include a single light emitting element. Each light emitting element 400 is preferably connected to a contact. Each light emitting element 400 is preferably connected to a single contact, but can alternatively be connected to multiple contacts. The light emitting elements 400 are preferably operable between a dim mode and a lit mode. In the dim mode, power to the light emitting elements 400 is reduced from that of the lit mode, or ceased. In the lit mode, the light emitting element 400 can be fully powered or supplied with more power than that of the dim mode. Each light emitting element 400 is preferably configured to operate in the lit mode when the respective contact is in the connected mode, and to operate in the dim mode when the respective contact is in the disconnected mode. In other words, each light emitting element 400 is configured to operate in the lit mode when within the arcuate area 110 defined from the brush 300, and in the off mode when outside of the arcuate area 110. The light emitting elements 400 are preferably light emitting diodes, but can alternatively be organic light emitting diodes, incandescent bulbs, or any other suitable light source. The light emitting element 400 preferably emits a white light or a red light, but can alternatively emit any other suitable wavelength of light. Each light emitting diode preferably includes a first and a second terminal (e.g., positive and negative, power and ground, etc.). The first terminal is preferably connected to the contact through the electrical connection 420. The second terminal is preferably connected to electrical ground. Electrical ground is preferably a portion of the vehicle frame, such as the axle 24, but can alternatively be the rim 28, frame, or any other suitable conductive portion of the vehicle. The second terminal is preferably connected to electrical ground through a second electrical connection that runs alongside the first electrical connection, wherein the wheel hub 22 can include a grounding member that electrically connects the second terminal to electrical ground. However, the light emitting element 400 can be otherwise grounded.

The light emitting elements 400 are configured to mount along an arcuate portion of the system or a rotating component of the vehicle, such that rotation of the system or rotating component sequentially moves the light emitting elements 400 into and out of the arcuate area 110. The light emitting elements 400 preferably mount to the wheel 20, but can alternatively mount to the contact support 220, the gear of the vehicle, the pedals of the vehicle, or any other suitable component. The light emitting elements 400 are preferably configured to mount to the component such that each light emitting element 400 projects light radially outward of an axis of component rotation, more preferably in a direction normal to the axis of component rotation but alternatively at any other suitable angle. The set of light emitting elements 400 can be divided into a first and second paired subset of light emitting elements 400, wherein each subset can mount to the opposing side of the wheel 20 or the vehicle. Each light emitting element 400 in the first subset is preferably paired with a light emitting element 400 in the second subset. The light emitted by a pair of light emitting elements 400 preferably intersect at a point radially outward of the mounting component, within a plane normal to the axis of rotation, more preferably within the center plane of the mounting component normal to the axis of component rotation. The light emitting elements 400 are preferably evenly radially distributed about the circumference of the mounting component, but can alternatively be unevenly distributed. The light emitting elements 400 are preferably arranged along the arcuate area 110 defined by the respective contact (e.g., at one end of the arcuate area, in the center of the arcuate area, etc.), but can alternatively be arranged in any other suitable position relative to the contact.

In a first variation, the light emitting elements 400 are configured to mount to a wheel 20. The light emitting elements 400 are preferably configured to mount to the rim 28 of a wheel 20, more preferably the side of the wheel 20 (e.g., parallel to a central plane shared by the circumference of the rim 28 and the midpoint of the hub), as shown in FIG. 2, but alternatively to the spokes 26 of the wheel or any other suitable portion of the wheel. Each wheel 20 preferably includes a first and second subset of light emitting elements 400 arranged along a first and second opposing side of the wheel, wherein the first subset of light emitting elements 400 is paired with a corresponding light emitting element 400 of the second subset. However, each wheel 20 can include light emitting elements 400 along only a single side. The light emitting elements 400 are preferably incorporated into the wheel rim 28 (e.g., wherein the rim includes seats for the light emitting elements 400 or thinned out portions through which the light can shine through), but can alternatively be retained to the rim 28 by a circular mount that traces the rim 28 and mounts to the spokes 26 or mounting points on the rim 28. However, the light emitting elements 400 can be otherwise retained to the rim 28 of the wheel 20.

In a second variation, as shown in FIG. 9, the light emitting elements 400 are retained along the contact support 220. In the variation wherein the contact support 220 is a plate, the light emitting elements 400 are preferably arranged along the arcuate edge of the plate. The light emitting elements 400 can be angled relative to the plane of the plate, or can be aligned with the plate. Alternatively, the light emitting elements 400 can be mounted to a broad face of the plate, more preferably the broad face opposing the broad face supporting the contacts, but alternatively the same broad face. In the variation wherein the contact support 220 forms the hub 22, or wherein the plate is arranged inside the hub 22 between the hub 22 and the axle 24, the light emitting elements 400 can be arranged along the edge of the hub flange (e.g., radially outward of the hub central axis), or along the hub outer arcuate surface. Alternatively, the light emitting elements 400 can be arranged along the flat face of the hub flange, wherein the light emitting elements 400 are arranged to direct light radially outward of the hub 22. The light emitting elements 400 can be arranged along one side of the hub 22, or can be arranged along both sides of the hub 22. However, the light emitting elements 400 can be otherwise coupled to the vehicle in any other suitable manner.

The lighting control system 100 can additionally include a power source 500 that functions to provide power to the light emitting elements 400, as shown in FIG. 2. The power source 500 is preferably configured to mechanically mount to the vehicle frame, more preferably statically mount to the frame, but can alternatively be configured to mount to a rotating component. The power source 500 preferably substantially permanently mounts to the frame, but can alternatively transiently or removably mount to the frame. In one variation, the power source 500 mounts to the hub 22. In another variation, the power source 500 mounts to the fork. In another variation, the power source 500 mounts to the frame, below the seat of the vehicle. However, the power source 500 can mount to any other suitable portion of the vehicle. A first terminal of the power source is preferably electrically connected to the brush 300, but can alternatively be electrically connected to a contact. A second terminal of the power source is preferably electrically connected to electrical ground (e.g., a portion of the vehicle frame or another grounding element). The first terminal can be electrically connected to the lighting control system component (brush 300 or contact) by an electrical connector (e.g., wire) extending to an end of the axle 24 or hub 22. The first terminal can alternatively be connected to the lighting control system component by an electrical connector extending through a portion of the axle 24, wherein the axle 24 is hollow along all or a portion of the axle length and includes a radial hole fluidly connected to the axle lumen through which the electrical connector extends and connects to the lighting control system component. The first terminal can alternatively be electrically connected to the axle 24, wherein the axle 24 is electrically conductive and functions as the electrical connection 420 between the power source 500 and the lighting control system component. However, the power source 500 can be otherwise electrically connected to the lighting control system component.

The power source 500 is preferably formed from one or more secondary batteries (e.g., rechargeable batteries), but can alternatively be formed from one or more primary batteries. The batteries can be lithium ion batteries, lithium polymer batteries, nickel cadmium batteries, or any other suitable battery chemistry. Alternatively, the power source 500 can be a hub-mounted generator (e.g., a rotor rotating within a stator or applied magnetic field during wheel rotation) that generates power that is routed to the lighting control system. Alternatively, the power source 500 can use a fuel source (e.g., a fuel cell power generator). Alternatively, the power source 500 can be a magnet that applies magnetic field to a segment of the rotation path proximal the brush 300. A current is generated through the contact as the contact moves through the magnetic field, wherein the current powers the connected light emitting element. In this variation, the brush 300 does not need to mechanically connect to the contact. In this variation, the magnet can be a separate component from the brush 300, or the brush 300 can include the magnet.

Figure 14:
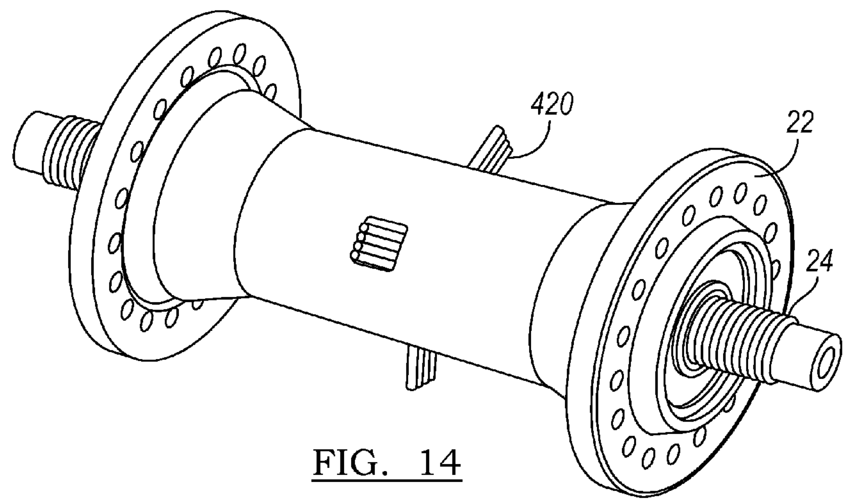
FIG. 14 is a perspective view of a first variation of electrical connection extension through the hub.
Figure 15:
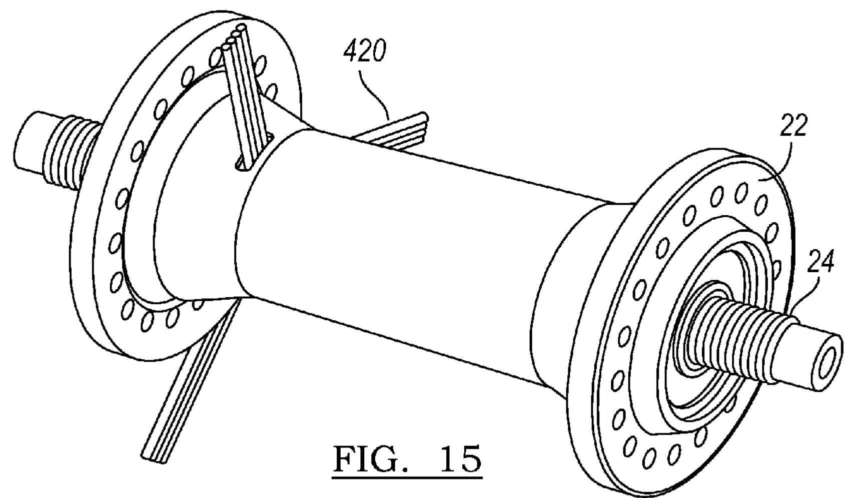
FIG. 15 is a perspective view of a second variation of electrical connection extension through the hub.
Figure 16:
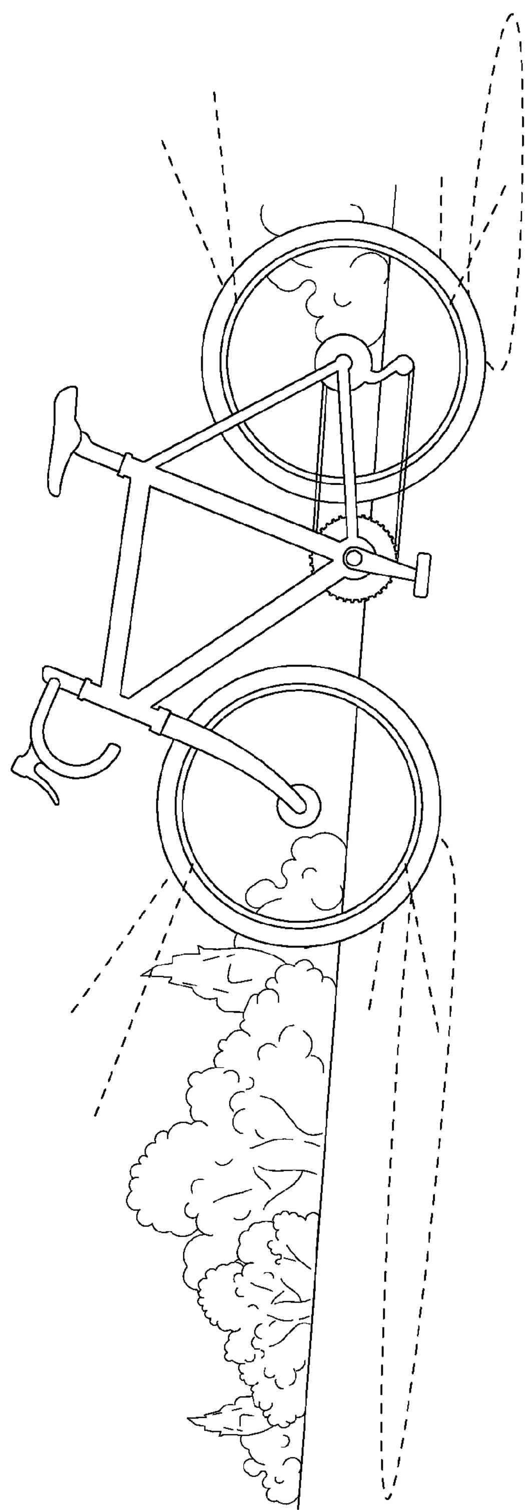
FIG. 16 is a perspective view of a bicycle with including the lighting control system.

The lighting control system 100 can additionally include an electrical connector that routes power from the contacts to the hub flange, hub end (e.g., as shown in FIG. 15), or support outer radial surface (e.g., as shown in FIG. 14). The electrical connector can alternatively extend from the contact to the light emitting element, or to any other suitable portion of the wheel 20 or vehicle. The electrical connector can be a series of wires (e.g., as shown in FIG. 6), a PCB wire strip (e.g., as shown in FIG. 3), or any other suitable electrical connection. The system preferably includes one electrical connector for each contact, wherein each electrical connector connects to a single contact, but can alternatively include any suitable number of electrical connectors. In one variation of the system, the electrical connectors are grouped, wherein the number of contact rings determines the number of electrical connectors in a group. However, the electrical connectors can be otherwise arranged.

The electrical connection 420 can additionally include electrical connection extensions that function to electrically connect an electrical connection 420 with a light emitting element. In one variation of the system, the electrical connection extension is a wire extending along a spoke of the wheel. The wire preferably extends along the exterior of the spoke, wherein the wire can be retained along its length by adhesive, ties, clips, or other coupling mechanisms. Alternatively, the wire can extend along the spoke interior (lumen), wherein the spoke is hollow. The spoke can be electrically insulative, or can be electrically conductive. In another variation, the electrical connection extension is the spoke, wherein the spoke is electrically conductive. In this variation, the spoke connection at the hub flange can include an electrical insulator. For example, the spoke connection be larger than conventional spoke connections (e.g., have a larger diameter), wherein electrical insulation can line the inner lumen of the spoke connection or be otherwise disposed between the hub 22 and the spoke. The spoke connection at the rim 28 (e.g., the spoke nipple) can additionally be electrically insulated, wherein the wheel 20 further includes a power takeoff that routes power from the spoke to the respective light emitting element. The power takeoff can be a washer electrically connected between the spoke nipple and the hub, a contact within the spoke nipple that is electrically connected to the spoke threads, the spoke nipple itself, wherein the rim 28 or rim seat for the spoke nipple is electrically insulated (e.g., includes a coating or electrically insulated washer, etc.), a contact in the rim 28 that the spoke abuts against, or can be any other suitable component. The system preferably includes one electrical connection extension for each electrical connection, but can alternatively include any suitable number of electrical connection extensions.

In a first example of the lighting control system, as shown in FIGS. 1, 3, 4, 5, 6, and 7, the lighting control system 100 includes a brush 300 configured to mount to the axle 24 of a wheel and a plurality of contacts 200 configured to mount to the hub 22 of the wheel. The plurality of contacts 200 are arranged on a hub shell configured to rotatably mount about the axle 24 and brush 300. The plurality of contacts 200 are arranged in a series of coaxial rings aligned along the rotational axis, wherein each ring is angularly displaced by an angular offset relative to the linearly adjacent ring. Each ring preferably includes the same number of contacts, wherein each contact preferably extends along the same angle measure. The brush 300 extends radially from the axle 24 along the plate face, wherein the longitudinal axis of the brush 300 preferably extends in parallel to the longitudinal axis of the axle 24 and parallel to the axis of contact rotation. The length of the brush 300 preferably extends along the length of the axle 24 encompassed by the hub 22 or by the contact rings. The power source 500 is preferably connected to the brush 300 by a wire extending along the axle 24 of the vehicle. Each light emitting element 400 is preferably mounted to the wheel rim 28, wherein the light emitting element 400 can be electrically connected to an individual contact by a wire routed along a spoke of the wheel.

In a second example of the lighting control system, as shown in FIGS. 8 and 9, the lighting control system 100 includes a brush 300 configured to mount to the axle 24 of a wheel and a plurality of contacts 200 configured to mount to the hub 22 of the wheel. The plurality of contacts 200 are arranged on a plate configured to mount normal to the hub axis or to extend radially beyond the outer arcuate surface of the hub. The plurality of contacts 200 are arranged in concentric rings, wherein each ring is angularly displaced by an angular offset relative to the radially adjacent ring. Each ring preferably includes the same number of contacts, wherein each contact preferably extends along the same angle measure. The brush 300 extends radially from the axle 24 along the plate face, wherein the longitudinal axis of the brush 300 preferably extends perpendicular to the longitudinal axis of the axle 24 and perpendicular to the axis of contact rotation. The power source 500 is preferably connected to the brush 300 by a wire extending along the fork of the vehicle. Each light emitting element 400 is preferably mounted to the plate, but can alternatively be mounted to the wheel rim 28, wherein the light emitting element 400 can be electrically connected to an individual contact by a wire routed along a spoke of the wheel.

Figure 12:
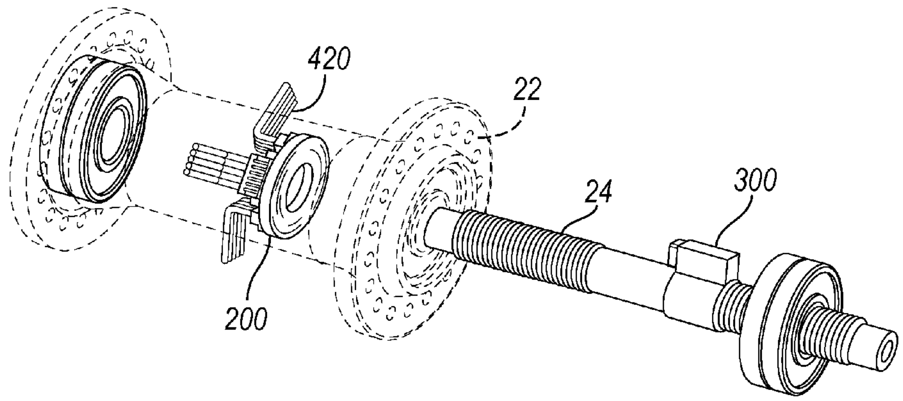
FIG. 12 is an exploded view of the third variation of the lighting control system.
Figure 13A:
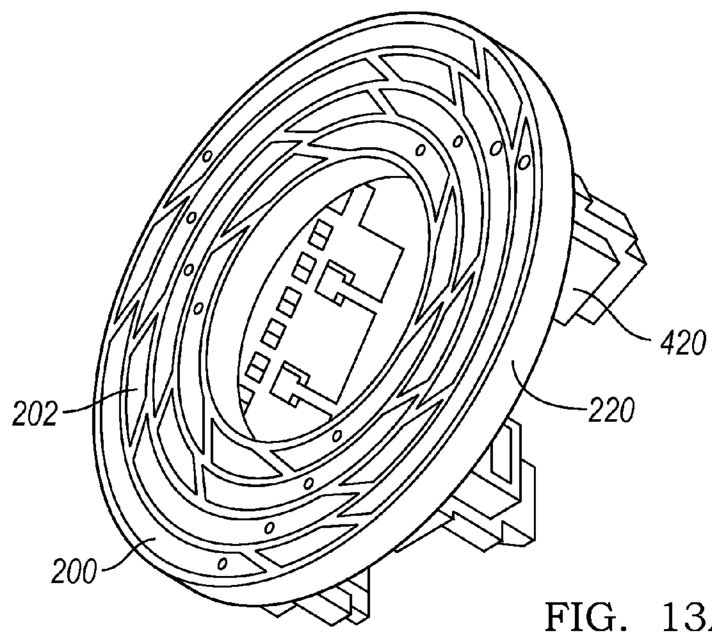
FIGS. 13A and 13B are perspective views of a contact face and an opposing face of a plate supporting the contacts of the third variation of the lighting control system.
Figure 13B:
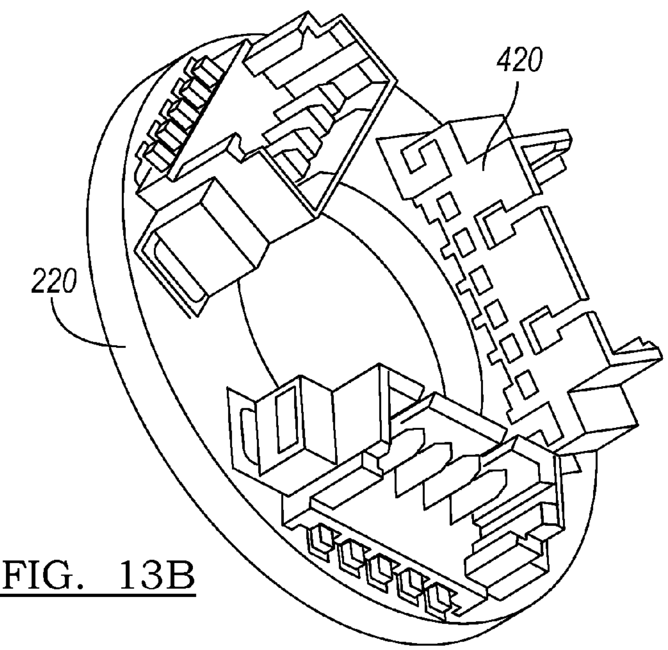

In a third example of the lighting control system, as shown in FIGS. 11, 12, and 13, the lighting control system 100 includes a brush 300 configured to mount to the axle 24 of a wheel and a plurality of contacts 200 configured to mount to the hub 22 of the wheel. The plurality of contacts 200 are arranged on a plate configured to mount normal to the hub axis or to extend radially toward the rotational axis from the inner arcuate surface of the hub 22. The plurality of contacts 200 are arranged in concentric rings, wherein each ring is angularly displaced by an angular offset relative to the radially adjacent ring. Each ring preferably includes the same number of contacts, wherein each contact preferably extends along the same angle measure. The brush 300 extends radially from the axle 24 along the plate face, wherein the longitudinal axis of the brush 300 preferably extends perpendicular to the longitudinal axis of the axle 24 and perpendicular to the axis of contact rotation. The length of the brush 300 is preferably less than the distance between the inner hub radius and the outer axle radius. The power source 500 is preferably connected to the brush 300 by a wire extending along the axle 24 of the vehicle. Each light emitting element 400 is preferably mounted to the wheel rim 28, wherein the light emitting element 400 can be electrically connected to an individual contact by a wire routed along a spoke of the wheel.

The lighting control system 100 can include a front and back lighting control system, wherein the front and back lighting control systems are configured to control the respective light emitting elements 400 to emit light radially outward of the vehicle. The front lighting control system 100 is configured to mount to or integrate with the front wheels of the vehicle (e.g., the wheels proximal the steering mechanism), and can include white, yellow, or any other suitable color. The back lighting control system 100 is configured to mount to or integrate with the back wheels of the vehicle (e.g., the wheels distal the steering mechanism), and can include red, blue, or any other suitable color. The back lighting control system 100 can additionally include a set of gears or a coupling mechanism configured to couple to a set of gears.

As a person skilled in the art will recognize from the previous detailed description and from the figures and claims, modifications and changes can be made to the preferred embodiments of the invention without departing from the scope of this invention defined in the following claims.

I claim:

1. A lighting control system for a wheel of a vehicle, the lighting control system comprising:

a brush configured to statically mount to a body of the vehicle;

a hub for the wheel;

a plurality of arcuate contacts statically mounted to the hub, each of the plurality of contacts comprising an arc angle measure of less than 360 degrees and configured to electrically couple to a light emitting element, the plurality of contacts configured to rotate relative to the brush, each contact operable between:

a connected mode wherein the contact is electrically connected to the brush during rotation relative to the brush, wherein the contact places the connected light emitting element in a lit mode; and a disconnected mode wherein the contact is electrically disconnected from the brush during rotation relative to the brush, wherein the contact places the connected light emitting element in a dim mode.

2. The system of claim 1, wherein the plurality of arcuate contacts are mounted to an arcuate surface of the hub.

3. The system of claim 2, wherein the brush comprises:

a body defining a lumen configured to statically mount to a wheel axle extending therethrough; and a radial protrusion configured to electrically connect with the contacts.

4. The system of claim 3, wherein the plurality of contacts are arranged in a series of coaxial rings, each ring cooperatively formed by multiple contacts, each ring angularly offset from an adjacent ring.

5. The system of claim 4, wherein the arc angle measure of each contact is 120 degrees or less, wherein each ring is angularly offset from the adjacent ring by 30 degrees.

6. The system of claim 4, wherein the radial protrusion extends from an arcuate surface of the brush body, wherein the rings are arranged along an inner arcuate surface of the hub.

7. The system of claim 1, further comprising a plurality of light emitting elements, each light emitting element electrically connected to one of the plurality of contacts, each of the light emitting elements operable between:

a lit mode while the contact is in the connected mode; and a dim mode while the contact is in the disconnected mode.

8. A lighting system for a wheel, the lighting system comprising:

a plurality of light emitting elements, each light emitting element operable between a lit mode and a dim mode;

an electrically conductive brush;

a plurality of contacts rotatably arranged relative to the brush, each contact electrically connected to one of the plurality of light emitting elements, each of the plurality of contacts operable between:

a connected mode along a segment of a contact rotation path relative to the brush, the segment having an arc angle of less than 360 degrees, wherein the contact is electrically connected with the brush and operates the respective light emitting element in the lit mode; and a disconnected mode outside of the segment, wherein the contact is disconnected from the brush and operates the respective light emitting element in the dim mode.

9. The system of claim 8, wherein the plurality of contacts are configured rotate about an axis of rotation substantially parallel to a longitudinal axis of the brush.

10. The system of claim 9, wherein the plurality of contacts are rotationally disposed about the brush and configured to rotate with the wheel.

11. The system of claim 10, wherein the plurality of contacts are angularly offset about an axis of rotation such that the brush simultaneously connects to a set number of contacts at any point during wheel rotation.

12. The system of claim 8, wherein the plurality of light emitting elements are configured to emit light radially outward of the wheel.

13. The system of claim 12, further comprising a ring configured to mount to a rim of the wheel, wherein the plurality of light emitting elements are substantially evenly dispersed about the ring.

14. A wheel for a vehicle, the wheel comprising:

an axle comprising an electrically conductive brush;

a hub comprising a plurality of electrical contacts tracing an arcuate segment of the hub, the arcuate segment having an arc angle less than 360 degrees, each contact operable between:

a connected mode wherein the contact is electrically connected to the brush during hub rotation; and a disconnected mode wherein the contact is electrically disconnected from the brush during hub rotation;

a rim comprising a plurality of light emitting elements, each light emitting element electrically connected to one of the plurality of electrical contacts, each light emitting element operable between:

a lit mode wherein the light emitting element projects light radially outward of the rim when the respective contact is in the connected mode; and a dim mode when the respective contact is in the disconnected mode.

15. The wheel of claim 14, wherein the plurality of electrical contacts is arranged along an inner arcuate surface of the hub, wherein the brush extends along a length of the axle from an arcuate surface of the axle.

16. The wheel of claim 14, further comprising a plurality of spokes extending from the hub to the rim, each spoke comprising an electrical connection between an electrical contact and the respective light emitting element.

17. The wheel of claim 16, wherein the electrical connection comprises the spoke, wherein spoke is conductive.

18. The wheel of claim 17, further comprising:

an electrically insulated spoke nipple mechanically coupling the spoke to the rim; and an electrically conductive takeoff electrically connecting the spoke to a terminal of the light emitting element.

19. The wheel of claim 18, wherein the takeoff comprises a washer coupled along the spoke between the spoke nipple and hub.

20. The wheel of claim 19, further comprising a power source electrically connected to the brush.

* * * * *